United States Patent [19]
Fischer et al.

[11] Patent Number: 5,991,062
[45] Date of Patent: Nov. 23, 1999

[54] METHOD AND DEVICE FOR OBTAINING ERROR SIGNALS FOR SPATIAL BEAM REGULATION OF AN OPTICAL COHERENT RECEIVER

[75] Inventors: Edgar Fischer, Müllheim Dorf; Bernhard Wandernoth, Kirchberg, both of Switzerland

[73] Assignee: Oerlikon Contraves AG, Zürich, Switzerland

[21] Appl. No.: 08/898,484

[22] Filed: Jul. 22, 1997

[30] Foreign Application Priority Data

Sep. 22, 1996 [CH] Switzerland .................... 2307/96

[51] Int. Cl.$^6$ .................................................. H04B 10/06
[52] U.S. Cl. ........................................ 359/191; 359/190
[58] Field of Search .................................. 359/159, 162, 359/190–191, 326

[56] References Cited

U.S. PATENT DOCUMENTS

| | | | |
|---|---|---|---|
| 4,723,317 | 2/1988 | Glance | 359/191 |
| 5,007,106 | 4/1991 | Kahn et al. | 359/190 |
| 5,030,004 | 7/1991 | Grant et al. | 356/153 |

FOREIGN PATENT DOCUMENTS 0642236  3/1995  European Pat. Off. .

OTHER PUBLICATIONS

M. Wittig et al., "I–Orbit Measurements of Microaccelerations of ESA's Communication Satellite Olympus", SPIE Proceedings, vol. 1218, pp. 205–214, 1990.

W. Hayden et al., "Wide–Band Precision Two–Axis Beam Steerer Tracking Servo Design and Teset Results", SPIE Proceedings, vol. 1866, pp. 271–279m 1993.

Eric A. Swanson et al., "Heterodyne Spatial Tracking System for Optical Space Communication", IEEE Transactions on Communications, vol. 34, No. 2, pp. 118–126, Feb., 1986.

Martin F. Hueber et al., "Heterodyne Acquisition and Tracking in a Free Space Diode Laser Link", Free Space Communication Technologies III, 1–10, pp. 233–239, Jan. 21–22, 1991.

Jackie S. C. Fung, "A Novel Angular Discriminator for Spatial Tracking in Free–Space Laser Communications", Free–Space Laser Communication Technologies III, vol. 1417, pp. 224–232, Jan. 21–22, 1991.

T.C. Strand et al., "Aberration Limits for Annular Gaussian Beams for Optical Storage", Applied Optics, vol. 33, No. 16, pp. 3533–3539, Jun. 1, 1994.

*Primary Examiner*—Kinfe-Michael Negash
*Attorney, Agent, or Firm*—Browdy And Neimark

[57] ABSTRACT

In connection with a method and a device for the control of the optical alignment of two lightwaves in the course of a coherent superimposed reception a spatial beam regulation is achieved in that the light of a local laser (5) is superimposed on the received light (1), that then the signal obtained in this manner is divided into two identical beam portions (1A, 1B) by means of a beam splitter (2) and that a respective error signal (14, 16) is generated from the two portions by means of a respective detector arrangement (3, 4), so that the two error signal portions result in a spatial error signal. The original data signal (15) is again obtained by the addition with the correct signs of the error signal portions.

21 Claims, 2 Drawing Sheets

METHOD AND DEVICE FOR OBTAINING ERROR SIGNALS FOR SPATIAL BEAM REGULATION OF AN OPTICAL COHERENT RECEIVER

FIELD OF THE INVENTION

The instant invention relates to a method and a device for controlling the alignment of two lightwaves in the course of a coherent superimposed reception.

BACKGROUND OF THE INVENTION

The transmission of information in space by means of light is an alternative to microwave connections, which is of interest since improved beam bundling and therefore a considerably increased antenna gain are connected with an increase of the carrier frequency. This advantage can be used to reduce the size of the antennas which are to be used, to reduce the corresponding transmission output or to increase the data rate to be transmitted. By means of this it is possible to reduce the weight and the energy consumption, both of which are criteria which are of decisive importance for satellite systems to be operated in space.

In optical communications both the direct reception which, although uncomplicated, is susceptible to background light, and the highly sensitive superimposed reception, which therefore is particularly suited for space applications, are offered. The gain in sensitivity with superimposed reception in contrast to direct reception, however, results in a considerably more elaborate realization, and furthermore makes greater demands on the components used.

A very narrow divergence angle is connected with the high antenna gain of optical antennas or telescopes, for which reason a very exact alignment of the antennas in respect to each other is necessary. In this case the beam regulation systems must be able to make connections free of disruptions possible, in spite of systematic and stochastic movements of the satellites.

As described in Wittig, M. et al. "In-Orbit Measurement of Microaccelerations of ESA's Communications Satellite OLYMPUS", SPIE Proceedings, vol. 1218 (1990), pp. 205 to 213, it is possible to model and interpret the stochastic movements as two Gaussian-distributed angular fluctuations for a satellite, which have an output density spectrum $S_\phi$ represented below:

$$S_{\varphi_{xy}}(f) = \frac{160 \frac{\mu rad^2}{Hz}}{1 + \left(\frac{f}{1\,Hz}\right)^2}$$

wherein the frequency of the angular fluctuations is identified by f.

A part of these angular fluctuations can be controlled by a beam regulating system, and a standard deviation of an uncompensated error signal of each component is obtained (see Hyden, W. et al., "Wide-Band Precision Two Axis Beam Steerer Tracking Servo Design and Test Results", SPIE Proceedings, vol. 1866 (1993), pp. 271 to 279):

$$\sigma_{\varphi_x, Rest} = \sigma_{\varphi_y, Rest} = \sqrt{\int_0^\infty S_{\varphi_{x,y}}(f) |G(f)|^2 \, df}$$

wherein the standard deviation of the uncompensated error signal of the two components is identified by $\sigma_{\phi_x, Rest}$, $\sigma_{\phi_y, Rest}$, and the interference signal transmission function of the beam regulating system by G(f). The uncompensated angular fluctuations are connected with a fluctuation of the detected output and result in an increase of the error probability of the compensating system.

It is possible in many cases to describe the interference signal transmission function as a first order high-pass filter with a limit frequency $f_g$:

$$G(f) = \frac{j\left(\frac{f}{f_g}\right)}{1 + j\left(\frac{f}{f_g}\right)}$$

Thus, the angular fluctuations are the better suppressed the higher the bandwidth of the beam regulating system.

However, a central problem in connection with beam regulation lies in finding a low-noise error signal suitable for a broad-band regulation.

Usually distinctions between the following concepts are made in optical superimposition systems:

In connection with obtaining an error signal by means of a direct reception, the received light is divided into two partial beams by means of a beam splitter, for example a semipermeable mirror. In this case one portion is usually coupled into a glass fiber, the light of a local laser is superimposed on it in a fiber coupler and is supplied to the coherent receiver of the communication system.

A second portion (partial beam) is supplied to a position detector, a CCD camera or a so-called four quadrant photodiode, and an error signal, in particular two spatial error signals, are generated by means of a suitable evaluation of the quadrants. If, for example, a sum signal is formed from the first two detector quadrants and is subtracted from the sum signal which is formed from the other two quadrants, an azimuthal error signal is obtained. By means of a cyclical exchange of the quadrants it is furthermore possible to obtain an elevation error signal (U.S. Pat. No. 5,030,004).

In this connection a combination of different detectors is also possible and known. The splitting of the beam into two portions can be omitted if, besides the communication laser, an additional laser of a different wavelength (BEACON) is used for beam regulation in the transmitter.

However, obtaining an error signal becomes problematic if the receiving telescope can also catch background light. In this case the signal-to-noise ratio of the error signal and therefore the noise suppression is bad. The portion of the received light possibly split off for the beam regulation is not available to the communications branch. The transmitting output required for a defined error probability is increased by this.

The adjustment of the detectors of the beam regulation system in connection with the communication system furthermore must meet the highest requirements. Because of the long signal processing times in the case of CCD cameras, or because of the bad signal-to-noise ratio because of background light, the attainable bandwidth of the noise suppression is clearly less than 1 kHz as a rule.

With the so-called Nutator principle, the directional characteristic of a receiving telescope is periodically changed, for example by means of a circular movement of the glass fiber of the receiver. Alternatively to this it is possible to deflect the received beam by means of movable lenses, mirrors or also acusto-optically or electro-optically.

If in this case the receiving telescope is not optimally aligned, the light output detected by the receiver fluctuates.

It is possible by means of suitable demodulation of this detected output to generate an error signal for beam regulation. Here, too, a CCD camera is mostly used in addition for the acquisition of the received beam.

In connection with the Nutator principle sketched above it is disadvantageous that with such methods the maximally attainable bandwidth of the noise suppression is approximately one tenth of the frequency of the circular movement superimposed on the received beam. For optical satellite communication the rotational frequency in this case must usually be greater than 10 kHz and, in case of a mechanical deflection of the received beam or of the glass fiber of the receiver makes the greatest demands of the components used. For this reason the use of such components in space appears to be not without problems.

This disadvantage is avoided, for example with an electro-optical or acusto-optical beam deflection, wherein as a rule this partially results in considerable optical losses.

In connection with the electro-optical or acusto-optical systems, the error signal for spatial beam regulation is mostly obtained by means of a synchronous demodulation of the detected optical output. In the process it is necessary, for example, to consider and control the temperature-dependent phase shift of the components which are involved in the beam regulation. A remaining error, which is unavoidable in actual use, results in a systematic loss in sensitivity, the same as the circular movement of the receiving characteristic.

A method for obtaining error signals for a spatial beam regulation of an optical superimposition receiver is known from European patent application EP-A2-0 642 236, in which an arrangement of silicon photodiodes is employed for the coherent reception of a data signal and for the direct reception of error signals.

OBJECT AND SUMMARY OF THE INVENTION

It is therefore the object of the invention to generate an error signal for spatial beam regulation of an optical superimposition receiver, while avoiding systematic losses to the greatest extent, with simultaneous minimal impairment of the data signal to be transmitted and with a good signal-to-noise ratio.

This object is attained in that an information lightwave is supplied to a receiving telescope, that means are provided in this receiving telescope for central shielding, that the light of a local laser is superimposed on the information lightwave, that the information lightwave is supplied to a detector arrangement for generating a spatial error signal, that the detector arrangement comprises at least respectively two detector halves, and that, when distributing the field to the respective two detector halves, an approximately equal field distribution is created by the beam formation of a local laser.

Further advantageous embodiments of the device ensue from the dependent claims.

The invention will be described in detail below by means of preferred embodiments, making reference to the drawings

DETAILED DESCRIPTION OF THE PREFERRED EMBODIMENTS

Figure 1:
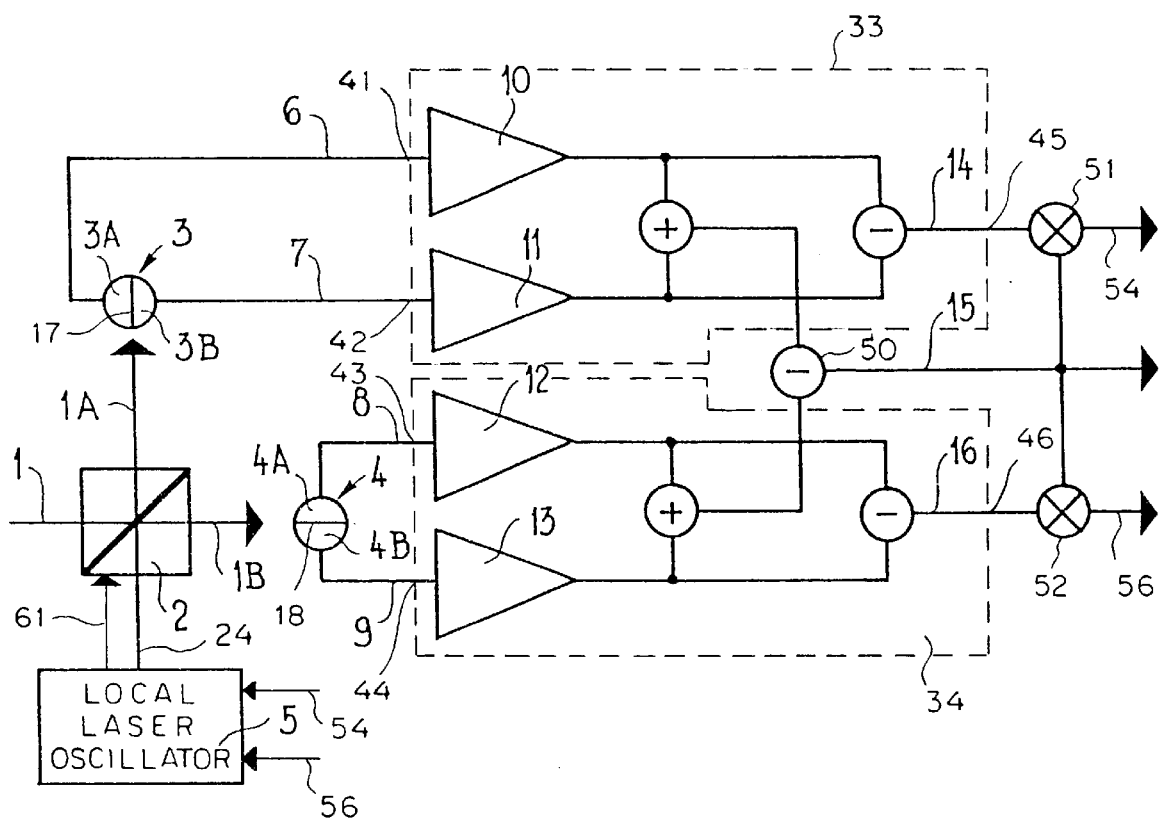
FIG. 1 is a basic representation of the method in accordance with the invention.

FIG. 1 shows a basic diagram of the process in connection with the coherent reception of a data signal 1 in combination with the employment of so-called balanced detectors 3, 4. With coherent reception, the balanced detector circuit is useful for suppressing the amplitude noise of the local oscillator. In the instant exemplary embodiment a local laser 5 is used for this. In this case the received data signal 1 is divided into two partial beams 1A and 1B by a beam splitter 2, and is then supplied to the balanced detectors 3, 4. The signal-to-noise distance is improved by a factor of 2 with this circuit technique, and the amplitude noise of the local oscillator is simultaneously suppressed.

Thus respectively two difference signals 6, 7 or 8, 9 are generated by the two detectors 3, 4, which are constructed of respectively two half-detectors 3A, 3B and 4A, 4B, and a spatial error signal 14, 16 is generated by an addition with the correct signs.

The corresponding difference signals 6, 7 or 8, 9 are amplified prior to the addition with the correct signs by means of appropriate front end amplifiers 10, 11 or 12, 13.

It remains still possible to generate the data signal 1 containing the information to be transmitted by forming the sum signal 15 from the four half-detectors 3A, 3B, 4A, 4B. A further problem occurs in the course of the transmission of high data rates (>$10^7$ bits per second), since there is the necessity, because of the large electrical bandwidth which must be achieved, to make the detectors as small as possible. This problem is solved in that the received light is focused on the detector arrangement with the aid of respectively one lens (optical focusing device), so that the received "flat wave" (a lightbeam appearing at the input to the beam splitter, which has already traveled a large distance) is focused. Finally, a more or less exact Fourier transformation takes place by means of the optical focusing device in front of the photodetector arrangement.

Furthermore, the amplitude distribution of the local laser beam is as a rule completely different from that of the received lightbeam. Often the amplitude distribution of the local laser has a Gaussian, that of the received light beam an Airy distribution. For this reason the electromagnetic field distribution immediately in front of the photodetector arrangement has two different field distributions, which have the result that the maximally possible photodiode signal, i.e. the maximally possible photo current, is not generated. Quantitatively the so-called mix effectiveness degree is reduced by this different field distribution.

In accordance with the invention, this mix efficiency, or rather the mix effectiveness degree, is now improved in that on the one hand a suitable beam shaping of the local laser is performed, and that on the other hand a corresponding energy redistribution—which is necessary because of the strip-shaped gap between the two detector halves, because otherwise there would be too large energy losses in the gap—of the received signal in the detector plane is performed. This redistribution of the energy out of the center into the side bands is accomplished by central shielding in the optical receiving device.

The methods of the beam shaping of the local laser 5 correspond to the current prior art and are therefore not represented here for the sake of clarity.

Figure 2:
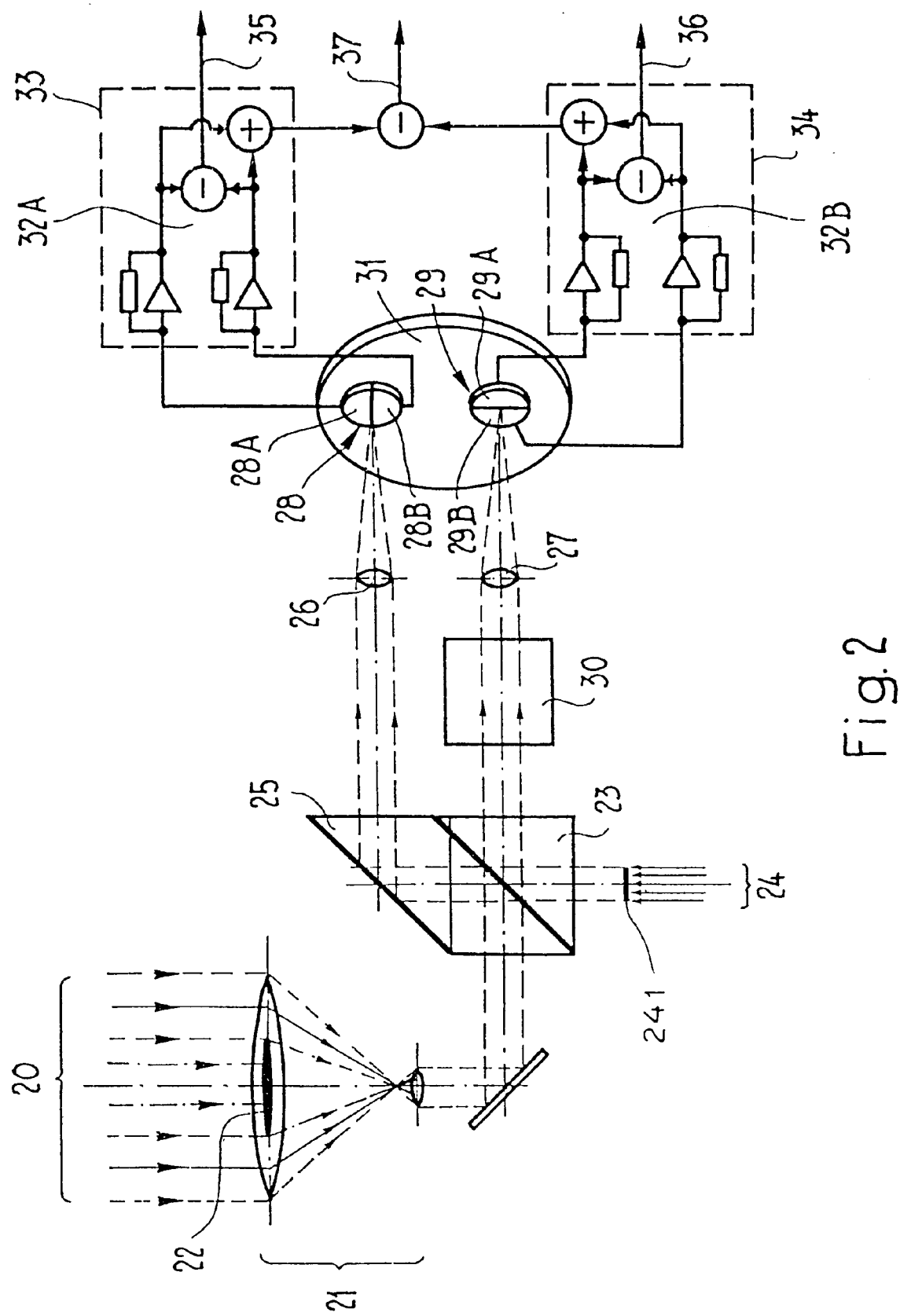
FIG. 2 represents an exemplary embodiment of a device for executing the method.

FIG. 2 schematically represents an exemplary embodiment of a device for executing the method. Here, a received signal 20 impinges on a receiving telescope 21 having a central shielding 22. In the course of focusing on the detectors 28, 29, this central shielding 22 causes a significant portion of the energy of the arriving received signal ("flat wave") to be displaced out of the center into the side bands. Furthermore, the light from a local laser 24, whose beam is shaped so that the mix efficiency is optimized, as already mentioned above, is coupled into the lightbeam via a beam splitter 23 (at a 90° angle to the received signal). This superimposed lightbeam I is divided into two portions $I_1$, $I_2$ because of the effective principle of the beam splitter 23, wherein the one portion $I_1$ is conducted via a reversing prism 25 onto a first thin lens 26, is focused there and is subsequently conducted to a first detector 28. The second portion $I_2$ of the lightbeam is taken out at the beam splitter 23 and is conducted via a compensating plate 30 and a second thin lens 27 for focusing the second portion $I_2$ of the lightbeam to a second detector 29. The compensation plate 30 is used for compensating the running time in regard to the optically longer path of the first portion $I_1$ in respect to the second portion $I_2$ of the lightbeam.

To generate the two spatial error signals, the two detectors, the first detector 28 and the second detector 29, are respectively divided into two halves 28A, 28B and 29A, 29B. The division consists of a strip-shaped interruption in the electrode surface of the photodiode. As schematically indicated by respectively a line in the drawings between 28A and 28B and between 29A and 29B, a differential signal from the two detector halves is therefore received at each detector, i.e., an error signal in respectively one spatial direction. The two detectors 28, 29 are now arranged in such a way that the two strip-shaped interruptions are placed orthogonally in respect to each other, so that with this arrangement two error signals 35, 36 are obtained in two spatial directions which are vertical to each other.

Based on the above mentioned energy displacement into the side bands, it is furthermore provided that reduced energy losses occur in the strip-shaped gap between the two halves 28A, 28B and 29A, 29B of the two detectors 28 and 29.

The two detectors 28 and 29 are housed on a common substrate 31 (see the enlarged perspective representation in FIG. 2). Furthermore, a balanced front end amplifier arrangement 32A, 32B, known per se, is respectively provided at the output of the two detectors 28 and 29.

It is particularly advantageous to also arrange the front end amplifier arrangement 32A, 32B on the substrate as units 33, 34.

An electrical sum signal 37 again provides the information from the received optical signal 20, so that it was possible to realize from this signal not only the communication, but also to generate an error signal.

Preferably two mixers are provided in the arrangements in accordance with FIGS. 1 and 2, wherein the one mixer is acted upon at the input side on the one hand by the error signal 14 (FIG. 1) or 35 (FIG. 2) and on the other hand by the data signal 15 (FIG. 1) or 37 (FIG. 2), wherein the other mixer is acted upon at the input side on the one hand by the error signal 16 (FIG. 1) or 36 (FIG. 2) and on the other hand by the data signal 15 (FIG. 1) or 37 (FIG. 2). A dual-axis switch-off system, for example in the form of a tilting mirror, is located between the receiving telescope 21 and the beam splitter 23, which is controlled by the regulating signals at the outputs of these two mixers in the coordinates x and y, which are located in a plane extending perpendicularly in respect to the beam path of the receiving telescope 21.

According to FIGS. 1 and 2, means 241 are provided before said beam splitter 23, 25 or splitter 2 (FIG. 1) in such a way that the light beam 24 of the local laser means 5 (FIG. 1) focused over said focusing means 26, 27 (FIG. 2) generates in each of said both detector zones 18A, 28B and 29A, 29B or 3A, 3B and 4A, 4B (FIG. 1) an electrical field distribution, which in its shape is approximately similar to an electrical field generated by said received laser beam 20 focused into said both detector zones over said focusing means.

According to FIG. 1 the two detectors 3, 4 have each a strip-shaped interruption 17, 18 in an electrode surface of a photodiode separating two detector zones, and the receiver comprises two electronic amplifier units 33 and 34. The first amplifier unit 33 has an input 41 connected to a first zone 3A of said first detector 3 and another input 42 connected to the second zone 3B of said first detector 3, and the second electronic amplifier unit 34 has an input 43 connected to a first zone 4A of said second detector 4 and another input 44 connected to the second zone 4B of said second detector 4. Said electronic units 33 and 34 have each a difference signal output 45, 46 giving each an error signal 14, 15 or 35, 36 (FIG. 2) and both have also each an addition signal output 48, 49. A subtraction means 47 is also provided which is connected to the addition signal output 48 of the first unit and to the addition signal output 49 of the second unit, wherein said subtraction means 47 has an output 50 giving a data signal 15 or 37. Said first mixer 51 is connected to the difference signal output 45 of the first unit 33 and to the output 50 of said subtraction means 47, and said second mixer 52 is connected to the difference signal output 46 of the second unit 34 and to the output 50 of said subtraction means 47. The output signals 54 and 56 or the signals 35 and 36 are control signals for two coordinates. The local laser means 5 includes in addition to a local laser also control means 61 for spatial beam regulation of the optical coherent receiver.

The monochromatic lightwave generated in the transmitter is phase-modulated. The data signal is preferably conducted through a scrambler in the transmitter before the lightwave is modulated with the data signal. Preferably the data signal lies in the range between 1 and 10 gigabits/s. The arrangements in accordance with FIGS. 1 and 2 in the receiver then can have a corresponding scrambler, which is supplied with the data signal 15 or 37. It is possible by means of this to eliminate interfering, slowly changing d.c.-voltage components of the data signal 15 or 37 to a large extent, which result if at times too many ones and zeros arrive one after the other. The shielding 22, which for example can be located in the one lens of the receiving telescope 21, is schematically represented in FIG. 2 by a line. By means of optical refraction effects this shielding causes a modification of the diffraction image in such a way that, in comparison with a typical diffraction image without shielding, a portion of the energy of the incoming signal is displaced out of the center of the geometric or optical beam path into the side bands. This results in that the large maximum (maximum maximorum) in the center of a typical diffraction image is slightly reduced, while the laterally fading (smaller, relative) maxima are slightly increased. Interesting in this connection are the two relative maxima of approximately the same size, which are respectively located on one side of the high absolute central maximum, in whose area the width between its crossovers is approximately twice as large as the corresponding width of the relative maxima. A typical diffraction image is similar to a band-limited pulse with a $\cos^2$-spectrum and crossovers at t–iT (i–1, 2, 3 . . . ).

The beam shaping of the local laser 5 or 24 is performed in such a way that the laser beam generates an electrical field distribution in the two detector halves, which in its shape is approximately similar to the electrical field distribution which results in the two detector halves 3A, 3B, 28A, 28B or 4A, 4B, 29A, 29B by means of the received information light beam and which has a diffraction image which is modified by the shielding 22, where in particular both field distributions have at least approximately the same crossovers. For this purpose a shielding can therefore also be present in the beam path of the local laser.

A total phase difference or phase jump of 180° results between the detectors 3 and 4 or 28 and 29. By subtraction of the output signals (partial data signals), for example of the units 33 and 34, the useful signal 37 therefore results as the sum of the absolute value of the two partial signals. The partial beams 1A and 1B (FIG. 1) or $I_1$ and $I_2$ are linearly polarized in the same manner. The, for example, round plate 31 (FIG. 2) is preferably a semiconductor substrate, on which the photodetectors 28, 29 are mounted. The local laser can be coupled in rigid phase with the received carrier wave by means known per se in order to achieve a homodyne reception.

What is claimed is:

1. A method, for obtaining error signals for spatial beam regulation of an optical coherent receiver, comprising:

providing a receiving telescope (21) for receiving a received light beam (20) modulated with information data;

providing a local laser device (5) outputting local laser light (24);

superimposing said received light beam (20) and said local laser light (24) in a beam splitter (2;23,25);

dividing said received light beam (20) and said local laser light (24) in the beam splitter (2;23,25) into a first mixed light beam (1A) and a second mixed light beam (2A);

receiving said first mixed light beam (1A) in a first detector (3;28) via a first focusing device (26), receiving said second mixed light beam (1B) in a second detector (29) via a second focusing device (27), said first and second detectors each comprising two respective detectors zones (3A, 3B; 4A, 4B; 28A; 29A, 29B) each generating at least a first spatial error signal (14;35) and a second spatial error signal (16;36) respectively; and shaping the local laser light (24), with a laser beam shaper (241) disposed before said beam splitter (2; 23, 25), to include a laser-light electrical field distribution approximately similar in shape to a received light (20) electrical field distribution focused onto each of said two detector zones (3A, 3B; 4A, 4B; 28A, 28B; 29A, 29B) by said first focusing device and said second focusing device (26,27).

2. The method for obtaining error signals in accordance with claim 1, wherein the received laser beam field and the local laser beam field have approximately equal crossovers.

3. The method for obtaining error signals in accordance with claim 1, further comprising:

providing a first balanced detector and a second balanced detector (3,4) each yielding two difference signals (6, 7; 8, 9) having a phase difference;

generating, by addition or subtraction of said two difference signals (6,7) of said first balanced detector (3), said first spatial error signals (14; 35); and generating, by addition or subtraction of said two difference signals (6,7) of said second balanced detector (4), said second spatial error signal (16; 36); and providing said laser beam shaper (241) comprises central shielding.

4. A device for obtaining error signals for spatial beam regulation of an optical coherent receiver comprising:

a receiving telescope (21) for receiving a received light beam (20) modulated with information data;

a local laser device (5) outputting local laser light (24);

a beam splitter (2; 23, 25) wherein said received light beam (20) and said local laser light (24) are superimposed and divided into a first mixed light beam (1A) and second mixed light beam (1B);

detectors comprising a first detector (28) receiving said first mixed light beam (1A) via a first focusing device (26), and a second detector (29) receiving said second mixed light beam (1B) via a second focusing device (27);

said first detector and said second detector each comprising two detector zones (3A, 3B; 4A, 4B; 18A, 28B; 29A, 29B) for generating each at least a first spatial error signal (14; 35) and a second spatial error signal (16; 36) respectively; and a laser beam shaper (241) disposed before said beam splitter (2; 23, 25) in such a way that the local laser light (24) of the local laser device (5), focused via said first focusing device and said second focusing device (26, 27), generates in each of said both detector zones (3A, 3B; 4A, 4B; 18A, 28B; 29A, 29B) an electrical field distribution including a shape approximately similar to a shape of an electrical field generated by said received laser beam (20) focused into said both detector zones via said first focusing device and said second focusing device.

5. The device in accordance with claim 4, wherein:

the two detectors (3,4) each include a respective strip-shaped interruption (17,18) in an electrode surface of a photodiode separating two detector zones; and wherein the device comprises units including a first electronic amplifier unit (33) having an input (41) connected to a first zone (3A) of said first detector (3) and another input (42) connected to the second zone (3B) of said first detector (3), and a second electronic amplifier unit (34) having an input (43) connected to a first zone (4A) of said second detector (4) and another input (44) connected to the second zone (4B) of said second detector (4);

said electronic units (33; 34) each including a difference signal output (45, 46) giving each an error signal (14, 16; 35, 36) and each including an addition signal output (48, 49); and a subtracter (47) connected to the addition signal output (48) of the first unit and to the addition signal output (49) of the second unit, and wherein the output (50) of said subtracter produces a data signal (15; 37).

6. The device in accordance with claim 5, further comprising:

a first mixer (51) connected to the difference signal output (45) of the first unit (33) and to the output (50) of said subtracter (47);

a second mixer (52) connected to the difference signal output (46) of the second unit (34) and to the output (50) of said subtracter (47);

and wherein the output signals (54; 56) of said two mixers (51; 52) comprise control signals for two coordinates.

7. The device in accordance with claim 6, wherein said first focusing device and said second focusing device (26, 27) comprise thin lenses (26, 27) placed in front of each of the two detectors (28, 29), and comprising a compensation plate (30) switched in ahead of one of the lenses (27).

8. The device in accordance with claim 6, wherein gaps (17, 18) between said two detector zones (3A, 3B, 28A, 28B, or 4A, 4B;, 29A, 29B) are arranged orthogonally with respect to each other.

9. The device in accordance with the claim 6, wherein said first mixed light beam (1A) and said second mixed light beam (1B) are linearly polarized in a same manner.

10. The device in accordance with claim 6, wherein said detectors (3, 4; 28, 29) comprise photodetectors disposed on a common semiconductor substrate (31), and wherein both electronic units (33, 34) and mixers (51, 52) are together housed on the substrate (31).

11. The device in accordance to claim 4, wherein a first central shielding (22) is provided in said receiving telescope (21) and a second shielding (241) is provided before said beam splitter (2; 23, 25), and wherein said first central shielding and said second shielding are matched in such a way that the light beam (24) of the local laser means (5) focused over said focusing device (26, 27) generates in each of said detector zones (3A,3B; 4A, 4B; 28A, 28B; 29A, 29B) an electrical field distribution including a shape approximately similar to an electrical field generated by said received laser beam (20) focused into both said detector zones via said focusing means.

12. The device in accordance with claim 11, wherein:
the two detectors (3,4) each include a respective strip-shaped interruption (17,18) in an electrode surface of a photodiode separating two detector zones; and wherein the device comprises
units including a first electronic amplifier unit (33) having an input (41) connected to a first zone (3A) of said first detector (3) and another input (42) connected to the second zone (3B) of said first detector (3), and
a second electronic amplifier unit (34) having an input (43) connected to a first zone (4A) of said second detector (4) and another input (44) connected to the second zone (4B) of said second detector (4);
said electronic units (33; 34) each including a difference signal output (45, 46) giving each an error signal (14, 16; 35, 36) and each including an addition signal output (48, 49); and
a subtracter (47) connected to the addition signal output (48) of the first unit and to the addition signal output (49) of the second unit, and wherein the output (50) of said subtracter produces a data signal (15; 37).

13. The device in accordance with claim 12, further comprising:
a first mixer (51) connected to the difference signal output (45 of the first unit (33) and to the output (50) of said subtraction means (47);
a second mixer (52) connected to difference signal output (46) of the second unit (34) and to the output (50) of said subtraction means (47);
and wherein the output signals (54; 56) of said two mixers (51; 52) comprise control signals for two coordinates.

14. A device for obtaining error signals for spatial beam regulation of an optical receiver, the device comprising:
a receiving telescope (21) and a beam splitter (2; 23, 25) for receiving light beams (20) modulated with information data;
a local laser device (5) producing local laser light (24);
wherein in said beam splitter (2; 23, 25) said received light beam (20) and said local laser light (24) are superimposed and divided into a first mixed light beam (1A) and a second mixed light beam (1B);
detectors including a first detector (28) receiving said first mixed light beam (1A) via a first focusing device (26) and
a second detector (29) receiving said second mixed light beam (1B) via a second focusing device (27);
said first and second detectors each comprising two detector zones (3A, 3B; 4A, 4B; 28A, 28B; 29A, 29B) each generating at least a first spatial error signal (14; 35) and a second spatial error signal (16; 36) respectively;
said two detectors (3, 4) each including a strip-shaped interruption (17, 18) in an electrode surface of a photodiode separating the two detector zones;
a first electronic amplifier unit (33) having an input (41) connected to a first zone (3A) of said first detector (3) and another input (42) connected to a second zone (3B) of said first detector (3);
a second electronic amplifier unit (34) having an input (43) connected to a first zone (4A) of said second detector and another input (44) connected to a second zone (4B) of said second detector(4);
said electronic units (33; 34) each including a difference signal output (45, 46) each yielding an error signal (14, 16; 35, 36) and each including an addition signal output (48, 49);
a subtracter (47) connected to the addition signal output (48) of the first unit and to the addition signal output (49) of the second unit;
and wherein the output (50) of said subtracter yields a data signal (15; 37);
a first mixer (51) connected to the difference signal output (45) of the first unit (33) and to the output (50) of said subtracter (47);
a second mixer (52) connected to the difference signal output (46) of the second unit (34) and to the output (50) of said subtracter (47);
and wherein the output signals (54; 56) of said two mixers (51; 52) comprise control signals for two coordinates.

15. The device in accordance with claim 14,
wherein said first focusing device and said second focusing device comprise thin lenses (26, 27) placed in front of each of the two detectors (28, 29);
wherein said detectors (28, 29) comprise photodetectors (28, 29) disposed on a common semiconductor substrate (31); and
comprising a compensation plate (30) switched in ahead of one lens (27).

16. The device in accordance with claim 14, wherein gaps between said two detector zone (3A, 3B, 28A, 28B, or 4A, 4B; 29A, 29B) are arranged orthogonally in respect to each other, and wherein said first mixed light beam (1A) and said second mixed light beam (1B) are linearly polarized in a same manner.

17. The device in accordance with claim 14, wherein said local laser light includes an approximately a Gaussian distribution, and wherein the local laser device (5) focused through said focusing means (26, 27) generates in each of said detector zones (3A, 3B; 4A, 4B; 28A, 28B; 29A, 29B) an electrical field distribution including a shapes thereof which is approximately similar to an electrical field generated by said received laser beam (20) focused into both said detector zones via said first focusing device and said second focusing device and having approximately an Airy distribution.

18. The device in accordance with claim 14, wherein both front ends amplifier (32A, 32B) and mixers are together housed on a substrate (31).

19. The device in accordance with claim 14, wherein the optical receiver receives a phase-modulated monochromatic lightwave.

20. The device in accordance with claim 14, wherein the light beams (20) modulated with information data include a data signal in the range between 1 and 10 Gigabits/s.

21. The device in accordance with claim 14, comprising a dual-axis switch-off system between the receiving telescope (21) and the beam splitter (23) which is controlled by output signals of said two mixers in two coordinates.

* * * * *